US006957427B1

(12) United States Patent
Wollrath et al.

(10) Patent No.: US 6,957,427 B1
(45) Date of Patent: Oct. 18, 2005

(54) REMOTE OBJECT ACTIVATION IN A DISTRIBUTED SYSTEM

(75) Inventors: Ann M. Wollrath, Groton, MA (US); Peter C. Jones, Winchester, MA (US); James H. Waldo, Dracut, MA (US); Robert W. Scheifler, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/950,760

(22) Filed: Oct. 15, 1997

(51) Int. Cl.[7] .............................. G06F 17/00; G06F 9/44
(52) U.S. Cl. .......................................... 718/1; 719/315
(58) Field of Search ................................ 395/800, 682, 395/185.1, 701, 200.33; 709/1, 100, 102, 104, 106, 315, 330; 719/315, 316, 330; 718/1, 106, 104, 102, 100; 707/103 R (56) References Cited

U.S. PATENT DOCUMENTS

| | | | |
|---|---|---|---|
| 4,430,699 A | 2/1984 | Segarra et al. | |
| 4,491,946 A | 1/1985 | Kryskow, Jr. et al. | |
| 4,558,413 A | 12/1985 | Schmidt et al. | |
| 4,567,359 A | 1/1986 | Lockwood | |
| 4,713,806 A | 12/1987 | Oberlander et al. | |
| 4,809,160 A | 2/1989 | Mahon et al. | |

(Continued)

FOREIGN PATENT DOCUMENTS

| | | |
|---|---|---|
| EP | 0 300 516 A2 | 1/1989 |
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |

(Continued)

OTHER PUBLICATIONS

Guttman, et al, "A Methodology for Developing Distributed Applications", Object Magazine, Jan. 1993, pp. 55–59.*
A. Wollrath, et al, Simple Activation for Distributed Ojbects, Sun Microsystems Laboratories, Inc. Nov. 1995, pp. 1–17.*
Java 1.2 Unleashed, Sams.net, chapter 39, section "Automatic Ojbect Activation", 1998. pp. (6).*
J. Waldo, "Remote procedure calls and Java Remote Method Invocation", IEEE, pp. 5–7, Jul. 1998.*
Amitabh et al., Proxies, Application Interfaces, and Distributed Systems, IEEE, pp. 212–220, 1992.
Wollrath et al., "Java–Centric Distributed Computing," IEEE Micro, pp. 44–53, May/Jun. 1997.
"Consumers Can View, Share Picture On–Line as Kodak Picture Network Goes 'Live'," Business Wire, Aug. 25, 1997, pp. 18–19.
"Eden Project Proposal," Department of Computer Science, University of Washington, Oct. 1980, Technical Report #80–10–01, cover and Foreword.
"ISN Dataweb Sells Software, Hardware," Datamation, Apr. 1, 1996, p. 40.
"Java (TM) Object Serialization Specification", Sun Microsystems, Inc., XP–002242372, <www.dei.estg.iplei.pt/P3/N/material/extra/serial–spec–JDK1_2.pdf>, 1998.

(Continued)

*Primary Examiner*—Sue Lao
(74) *Attorney, Agent, or Firm*—Finnegan, Henderson, Farabow, Garrett & Dunner, L.L.P.

(57) ABSTRACT

A distributed computer system uses a single interface at the client site to handle calls to call both active and passive remote objects. Accordingly, the calling process does not need to be aware of distinctions between active and passive objects. Further, remote objects are aggregated into common groups of objects, thereby providing greater security between objects of disparate groups and efficiency between related objects of the same group. Preferably, different groups are run on different Java virtual machines.

36 Claims, 4 Drawing Sheets

U.S. PATENT DOCUMENTS

| | | |
|---|---|---|
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,101,346 A | 3/1992 | Ohtsuki |
| 5,109,486 A | 4/1992 | Seymour |
| 5,187,787 A | 2/1993 | Skeen et al. |
| 5,201,049 A * | 4/1993 | Shorter .................. 395/650 |
| 5,218,699 A | 6/1993 | Brandle et al. |
| 5,253,165 A | 10/1993 | Leiseca et al. |
| 5,257,369 A | 10/1993 | Skeen et al. |
| 5,293,614 A | 3/1994 | Ferguson et al. |
| 5,297,283 A | 3/1994 | Kelly, Jr. et al. |
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,430 A | 8/1994 | Lundin et al. |
| 5,339,435 A | 8/1994 | Lubkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A * | 12/1995 | Waldo et al. ............. 719/316 |
| 5,475,840 A | 12/1995 | Nelson et al. |
| 5,481,721 A | 1/1996 | Serlet et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pettus |
| 5,603,031 A | 2/1997 | White et al. |
| 5,613,148 A * | 3/1997 | Bezviner et al. ............ 395/800 |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,675,796 A | 10/1997 | Hodges et al. |
| 5,675,797 A | 10/1997 | Chung et al. |
| 5,680,573 A | 10/1997 | Rubin et al. |
| 5,680,617 A | 10/1997 | Gough et al. |
| 5,684,955 A | 11/1997 | Meyer et al. |
| 5,687,373 A * | 11/1997 | Holmes et al. ............. 395/682 |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,832 A | 2/1998 | Westrope et al. |
| 5,724,503 A * | 3/1998 | Kleinman et al. ........ 395/185.1 |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,737,607 A * | 4/1998 | Hamilton et al. ............ 395/701 |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,427 A * | 7/1998 | Benantar et al. ............... 707/9 |
| 5,787,431 A | 7/1998 | Shaughnessy |
| 5,790,548 A | 8/1998 | Sistanizadeh et al. |
| 5,790,677 A | 8/1998 | Fox et al. |
| 5,793,965 A * | 8/1998 | Vanderbilt et al. ...... 395/200.33 |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,806,042 A | 9/1998 | Kelly et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |

| | | | | | | |
|---|---|---|---|---|---|---|
| 5,845,129 A | 12/1998 | Wendorf et al. | | 6,182,083 B1 | 1/2001 | Scheifler et al. |
| 5,850,442 A | 12/1998 | Muftic | | 6,185,602 B1 | 2/2001 | Bayrakeri |
| 5,860,004 A | 1/1999 | Fowlow et al. | | 6,185,611 B1 | 2/2001 | Waldo et al. |
| 5,860,153 A | 1/1999 | Matena et al. | | 6,189,046 B1 | 2/2001 | Moore et al. |
| 5,864,862 A | 1/1999 | Kriens et al. | | 6,192,044 B1 | 2/2001 | Mack |
| 5,864,866 A | 1/1999 | Henckel et al. | | 6,199,068 B1 | 3/2001 | Carpenter |
| 5,872,928 A | 2/1999 | Lewis et al. | | 6,199,116 B1 | 3/2001 | May et al. |
| 5,872,973 A | 2/1999 | Mitchell et al. | | 6,212,578 B1 | 4/2001 | Racicot et al. |
| 5,875,335 A | 2/1999 | Beard | | 6,216,138 B1 | 4/2001 | Wells et al. |
| 5,878,411 A | 3/1999 | Borroughs et al. | | 6,216,158 B1 | 4/2001 | Luo et al. |
| 5,884,024 A | 3/1999 | Lim et al. | | 6,219,675 B1 | 4/2001 | Pal et al. |
| 5,884,079 A | 3/1999 | Furusawa | | 6,226,746 B1 | 5/2001 | Scheifler |
| 5,887,134 A | 3/1999 | Ebrahim | | 6,243,716 B1 | 6/2001 | Waldo et al. |
| 5,889,951 A | 3/1999 | Lombardi | | 6,243,814 B1 | 6/2001 | Matena |
| 5,890,158 A | 3/1999 | House et al. | | 6,247,091 B1 | 6/2001 | Lovett |
| 5,892,904 A | 4/1999 | Atkinson et al. | | 6,253,256 B1 | 6/2001 | Wollrath et al. |
| 5,901,315 A * | 5/1999 | Edwards et al. ............ 395/704 | | 6,263,350 B1 | 7/2001 | Wollrath et al. |
| 5,913,029 A | 6/1999 | Shostak | | 6,263,379 B1 | 7/2001 | Atkinson et al. |
| 5,933,497 A | 8/1999 | Beetcher et al. | | 6,272,559 B1 | 8/2001 | Jones et al. |
| 5,933,647 A | 8/1999 | Aronberg et al. | | 6,282,295 B1 | 8/2001 | Young et al. |
| 5,935,249 A | 8/1999 | Stern et al. | | 6,282,568 B1 | 8/2001 | Sondur et al. |
| 5,940,827 A | 8/1999 | Hapner et al. | | 6,282,581 B1 | 8/2001 | Moore et al. |
| 5,944,793 A | 8/1999 | Islam et al. | | 6,292,934 B1 | 9/2001 | Davidson et al. |
| 5,946,485 A | 8/1999 | Weeren et al. | | 6,301,613 B1 | 10/2001 | Ahlstrom et al. |
| 5,946,694 A | 8/1999 | Copeland et al. | | 6,339,783 B1 | 1/2002 | Horikiri |
| 5,949,998 A | 9/1999 | Fowlow et al. | | 6,343,308 B1 | 1/2002 | Marchesseault |
| 5,951,652 A | 9/1999 | Ingrassia, Jr. et al. | | 6,353,860 B1 * | 3/2002 | Hare et al. .................. 709/316 |
| 5,956,509 A | 9/1999 | Kevner | | 6,385,643 B1 | 5/2002 | Jacobs et al. |
| 5,961,582 A | 10/1999 | Gaines | | 6,408,342 B1 | 6/2002 | Moore et al. |
| 5,963,924 A | 10/1999 | Williams et al. | | 6,418,468 B1 | 7/2002 | Ahlstrom et al. |
| 5,963,947 A | 10/1999 | Ford et al. | | 6,553,428 B1 * | 4/2003 | Ruehle et al. .............. 709/330 |
| 5,966,531 A | 10/1999 | Skeen et al. | | 6,578,074 B1 | 6/2003 | Bahlmann |
| 5,969,967 A | 10/1999 | Aahlad et al. | | 6,604,127 B2 | 8/2003 | Murphy et al. |
| 5,974,201 A | 10/1999 | Chang et al. | | 6,604,140 B1 | 8/2003 | Beck et al. |
| 5,978,484 A | 11/1999 | Apperson et al. | | 6,654,793 B1 | 11/2003 | Wollrath et al. |
| 5,982,773 A | 11/1999 | Nishimura et al. | | 2002/0059212 A1 | 5/2002 | Takagi |
| 5,987,506 A | 11/1999 | Carter et al. | | 2003/0191984 A1 | 10/2003 | Murphy et al. |
| 5,991,808 A | 11/1999 | Border et al. | | | | |
| 5,996,075 A | 11/1999 | Matena | | FOREIGN PATENT DOCUMENTS | | |
| 5,999,179 A | 12/1999 | Kekic et al. | EP | 0 555 997 A2 | 8/1993 | |
| 5,999,988 A | 12/1999 | Pelegri-Llopart et al. | EP | 0 565 849 A2 | 10/1993 | |
| 6,003,050 A | 12/1999 | Silver et al. | EP | 0 569 195 A3 | 11/1993 | |
| 6,003,763 A | 12/1999 | Gallagher et al. | EP | 0 625 750 A2 | 11/1994 | |
| 6,009,103 A | 12/1999 | Woundy | EP | 0 635 792 A2 | 1/1995 | |
| 6,009,413 A | 12/1999 | Webber et al. | EP | 0 651 328 A1 | 5/1995 | |
| 6,009,464 A | 12/1999 | Hamilton et al. | EP | 0 660 231 A2 | 6/1995 | |
| 6,016,496 A | 1/2000 | Roberson | EP | 0 697 655 A2 | 2/1996 | |
| 6,016,516 A | 1/2000 | Horikiri | EP | 0 718 761 A1 | 6/1996 | |
| 6,018,619 A | 1/2000 | Allard et al. | EP | 0 767 432 A2 | 4/1997 | |
| 6,023,586 A | 2/2000 | Gaisford et al. | EP | 0 778 520 A2 | 6/1997 | |
| 6,026,414 A | 2/2000 | Anglin | EP | 0 794 493 A2 | 9/1997 | |
| 6,031,977 A | 2/2000 | Pettus | EP | 0 803 810 A2 | 10/1997 | |
| 6,032,151 A | 2/2000 | Arnold et al. | EP | 0 803 811 A2 | 10/1997 | |
| 6,034,925 A | 3/2000 | Wehmeyer | EP | 0 805 393 A2 | 11/1997 | |
| 6,044,381 A | 3/2000 | Boothby et al. | EP | 0 810 524 A1 | 12/1997 | |
| 6,052,761 A | 4/2000 | Hornung et al. | EP | 0 817 020 A2 | 1/1998 | |
| 6,055,562 A | 4/2000 | Devarakonda et al. | EP | 0 817 022 A2 | 1/1998 | |
| 6,058,381 A | 5/2000 | Nelson | EP | 0 817 025 A2 | 1/1998 | |
| 6,058,383 A | 5/2000 | Narasimhalu et al. | EP | 0 836 140 A2 | 4/1998 | |
| 6,061,699 A | 5/2000 | DiCecco et al. | GB | 2 253 079 A | 8/1992 | |
| 6,061,713 A | 5/2000 | Bharadhwaj | GB | 2 262 825 A | 6/1993 | |
| 6,067,575 A | 5/2000 | McManis et al. | GB | 2 305 087 A | 3/1997 | |
| 6,078,655 A | 6/2000 | Fahrer et al. | JP | 11-45187 | 2/1999 | |
| 6,085,255 A | 7/2000 | Vincent et al. | WO | WO92/07335 | 4/1992 | |
| 6,092,194 A | 7/2000 | Touboul | WO | WO92/09948 | 6/1992 | |
| 6,093,216 A | 7/2000 | Adl-Tabatabai et al. | WO | WO93/25962 A1 | 12/1993 | |
| 6,104,716 A | 8/2000 | Crichton et al. | WO | WO94/03855 | 2/1994 | |
| 6,108,346 A | 8/2000 | Doucette et al. | WO | WO96/03692 | 2/1996 | |
| 6,134,603 A | 10/2000 | Jones et al. | WO | WO96/10787 | 4/1996 | |
| 6,154,844 A | 11/2000 | Touboul et al. | WO | WO96/18947 | 6/1996 | |
| 6,157,960 A | 12/2000 | Kaminsky et al. | WO | WO96/24099 | 8/1996 | |

| | | |
|---|---|---|
| WO | WO98/02814 | 1/1998 |
| WO | WO98/04971 | 2/1998 |
| WO | WO99/17194 | 4/1999 |
| WO | WO01/13228 A2 | 2/2001 |
| WO | WO01/13228 A2 | 2/2001 |
| WO | WO01/86394 A2 | 11/2001 |
| WO | WO01/86394 A2 | 11/2001 |
| WO | WO01/90903 A1 | 11/2001 |
| WO | WO01/90903 A1 | 11/2001 |

OTHER PUBLICATIONS

"Java (TM) Remote Method Invocation Specification," Sun Microsystems, Inc., <Java.sun.com/products/jdk1.2beta1>, 1997.

"Java.io ObjectnputStream", XP-002243027, <java.sun-.com/products/jdk/1.1/docs/guide/serialization/spec>, 1998, p. 1230–1232, 1263–1264 & 1283.

"Kodak DC220 And DC260 Digital Cameras Are Shipping To Retailers Across The Country Cameras Are Optimized for USB Interface Supported in Windows 98," Business Wire, Jun. 24, 1998, pp. 42–44.

"Kodak demonstrates leadership across entire photographic category," M2 Presswire, Feb. 13, 1998, pp. 31–35.

"Kodak PhotoNet Online Makes It a Snap to Share Summer Photos," PR Newswire, Jul. 2, 1998, pp. 63–64.

"Kodak Picture Network.Sends Prints Home From the Holidays," Business Wire, Dec. 29, 1997, pp. 58–60.

"Photo processing made easy on the Internet; Storm Software and PictureVision team up with Konica Corp.," Business Wire, Feb. 22, 1996, pp. 3–4.

"Seeing your photos a whole new way," Business Wire, Dec. 12, 1996, pp. 9–10.

"Transparent Network Computing," Locus Computing Corporation, Jan. 5, 1995.

"Webwatch: MCI Announces Internet Access,", Boardwatch Magazine, Jan. 1995.

Administrator's Guide, Netscape Enterprise Server, Version 3.0, Netscape Communications Corp., 1998.

Agha et al., "Actorspaces: An Open Distributed Programming Paradigm," University of Illinois, Report No. UIUCDCS-R-92-1766, Open Systems Laboratory TR No. 8, pp. 1–12, Nov. 1992.

Ahmed et al., "A Program Building Tool for Parallel Applications," Yale University, pp. 1–23, Dec. 1, 1993.

Aldrich et al., "Providing Easier Access to Remote Objects in Client–Server Systems," System Sciences, 1998, Proceedings of the 31st Hawaii Internat'l. Conference, Jan. 6–9, 1998, pp. 366–375.

Aldrich et al., "Providing Easier Access to Remote Objects in Distributed Systems," Calif. Institute of Technology, www.cs.caitech.edu/%7Ejedi/paper/jedipaper.html, Nov. 21, 1997.

Alexander et al., "Active Bridging," Proceedings of the ACM/SIGCOMM'97 Conference, Cannes, France, Sep. 1997.

Almes et al., "Edmas: A Locally Distributed Mail System," Department of Computer Science, University of Washington, Technical Report 83–07–01, Jul. 7, 1983, Abstract & pp. 1–17.

Almes et al., "Research in Integrated Distributed Computing," Department of Computer Science, University of Washington, Oct. 1979, pp. 1–42.

Almes et al., "The Eden System: A Technical Review," Department of Computer Science, University of Washington, Technical Report 83–10–05, Oct. 1983, pp. 1–25.

Almes, "Integration and Distribution in the Eden System," Department of Computer Science, University of Washington, Technical Report 83–01–02, Jan. 19, 1983, pp. 1–18 & Abstract.

Almes, "The Evolution of the Eden Invocation Mechanism," Department of Computer Science, University of Washington, Technical Report 83–01–03, Jan. 19, 1983, pp. 1–14 & Abstract.

Anderson et al., "Persistent Linda: Linda + Transactions + Query Processing," Proceedings of the 13th Symposium on Fault Tolerant Systems, pp. 93–109, 1991.

Anonymous, "Change–Notification Service for Shared Files," IBM Technical Disclosure Bulletin, vol. 36, No. 8, pp. 77–82, XP–002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Arnold, Ken, "The Jini Architecture: Dynamic Services in a Flexible Network," Sun Microsystems, Inc., Proceedings of the 36th ACM IEEE Design Automation Conference, Jun. 1999, pp. 157–162.

Auto–ID Center, "Auto–ID Savant Specification 1.0," Version of Oct. 13, 2003 (58 pages).

Bandrowski, "Stores Without Doors: Kiosks Generate New Profits," Corporate Computing, Oct. 1992, pp. 193–195.

Beech et al., "Object Databases as Generalizations of Relational Databases," Computer Standards & Interfaces, vol. 13, No. 1/3, pp. 221–230, Amsterdam, NL, Jan. 1991.

Begole et al., "Transparent Sharing of Java Applets: A Replicated Approach," Oct. 1997, pp. 55–65.

Bertino et al., "Object–Oriented Database Management Systems: Concepts and Issues," Computer, vol. 24, No. 4, pp. 33–47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179–192, Jan. 1989.

Birrell et al., "Distributed Garbage Collection for Network Objects," Digital Systems Research Center, No. 116, pp. 1–8, Dec. 15, 1993.

Birrell et al., "Grapevine: An Exercise in Distributed Computing," Communications of the ACM, vol. 25, vol. 25, No. 4, pp. 260–274, Apr. 1982.

Birrell et al., "Implementing Remote Procedure Calls," ACM Transactions on Computer Systems, vol. 2, No. 1, pp. 39–59, Feb. 1984.

Birrell et al., "Network Objects," DEC SRC Research Report 115, Feb. 28, 1994.

Birrell et al., "Network Objects," Operating Systems Review, 27(5), pp. 217–230, Dec. 1993.

Black et al., "A Language for Distributed Programming," Department of Computer Science, University of Washington, Technical Report 86–02–03, Feb. 1986, p. 10.

Black et al., "Distribution and Abstract Types in Emerald," University of Washington, Technical Report No. 85–08–05, Aug. 1985, pp. 1–10.

Black et al., "Object Structure in the Emerald System," University of Washington, Technical Report 86–04–03, Apr. 1986, pp. 1–14.

Black et al., "The Eden Project: A Final Report," Department of Computer Science, University of Washington, Technical Report 86-11-01, Nov. 1986, pp. 1-28.

Black, "Supporting Distributed Applications: Experience with Eden," Department of Computer Science, University of Washington, Technical Report 85-03-02, Mar. 1985, pp. 1-21.

Black, "The Eden Programming Language," Department of Computer Science, FR-35, University of Washington, Technical Report 85-09-01, Sep. 1985, (Revised Dec. 1985), pp. 1-19.

Black, "The Eden Project: Overview and Experiences," Department of Computer Science, University of Washington, EUUG, Autumn '86 Conference Proceedings, Manchester, UK, Sep. 22-25, 1986, pp. 177-189.

Braine et al., "Object-Flow," 1997, pp. 418-419.

Bruno, "Working the Web," Data Communications, Apr. 1997, pp. 50-60.

Burns et al., "An Anlytical Study of Opportunistic Lease Renewal," Distributed Computing Systems, 21st International Conference, pp. 146-153, Apr. 2000.

Cannon et al., "Adding Fault-Tolerant Transaction Processing to LINDA," Software-Practice and Experience, vol. 24(5), pp. 449-466, May 1994.

Cardelli, "Obliq, A lightweight Language For Network Objects," Digital SRC, pp. 1-37, Nov. 5, 1993.

Carriero et al., "Distributed Data Structures in Linda," Principles of Programming Language, pp. 1-16, 1986.

Carriero et al., "Distributed Data Structures in Linda," Yale Research Report YALEU/DCS/RR-438, Nov. 1985.

Chung et al., "A 'Tiny' Pascal Compiler: Part1: The P-Code Interpreter," BYTE Publications, Inc., Sep. 1978.

Chung et al., "A 'Tiny' Pascal Compiler: Part 2: The P-Compiler," BYTE Publications, Inc., Oct. 1978.

Ciancarini et al., "Coordinating Distributed Applets with Shade/Java," Feb. 1998, pp. 130-138.

Cohen, "Electronic Commerce," USC/Information Sciences Institute, Oct. 1989.

Conhaim, "Online shopping: a beginner's guide; includes related listing of videotex services," Link-Up, vol. 5, No. 6, p. 32, Nov. 1988.

Coulouris et al., "Distributed Systems Concepts and Designs," Second Ediition, Addison-Wesley, 1994.

Dave et al., "Proxies, Application Interface, And Distributed Systems," Proceedings International Workshop On Object Orientation in Operating Systems, pp. 212-220, Sep. 24, 1992.

Delcambre et al., "Simulation of the Object Flow Model: A Conceptual Modeling Language for Object-Driven Applications," 1993, pp. 216-225.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.

Deux et al., "The O2 System," Communications Of The Association For Commuting Machinery, vol. 34, No. 10, pp. 34-48, Oct. 1, 1991.

Dijkstra, "Self-stabilizing Systems in Spite of Distributed Control," Communications of the ACM, vol. 17, No. 11, pp. 643-644, Nov. 1974.

Dolev et al., "On the Minimal Synchronism Needed for Distributed Consensus," Journal of the ACM, vol. 34, No. 1, pp. 77-97, Jan. 1987.

Dollimore et al., "The Design of a System for Distributing Shared Objects," The Computer Journal, No. 6, Cambridge, GB, Dec. 1991.

Dourish, "A Divergence-Based Model of Synchrony and Distribution in Collaborative Systems," Xerox Technical Report EPC-1194-102, pp. 1-10, 1994.

Drexler et al., "Incentive Engineering for Computational Resource Management," The Ecology of Computation, Elsevier Science Publishers B.V., pp. 231-266, 1988.

Droms, "RFC 1541 Dynamic Host Configuration Protocol," <http://www.cis.ohio-state.edu/htbin/rfc1541.html>, pp. 1-33, Oct. 1993.

Ellsworth, "Boom Town," Internet World, Jun. 1995, pp. 33-35.

Emms, "A Definition Of An Access Control Systems Language," Computer Standards And Interfaces, vol. 6, No. 4, pp. 443-454, Jan. 1, 1987.

Estrin, "Inter-Organization Networks: Implications of Access Control Requirements for Interconnection Protocols," ACM, 1986, pp. 254-263.

Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.

Fleischer, "SkyMall's 'Supplier Network' Takes Flight", Retailtech, The Technology Magazine for Retail Executives, Apr. 1997.

Foley, "Managing Campus-Wide Information Systems: Issues and Problems," Capitalizing on Communication, ACM SIGUCCS XVII, 1989, pp. 169-174.

Fryxell, "eaasySABRE," Link-Up, May/Jun. 1996, pp. 10-11.

Gardner, "Kodak Follows Startup Into Online Photo Processing Business," Internet World, Sep. 8, 1997, pp. 5-6.

Gelernter et al., "Parallel Programming in Linda," Yale University, pp. 1-21, Jan. 1985.

Gelernter, "Generative Communication in LInda," ACM Transactions on Programming Languages and Systems, vol. 7, No. 1, pp. 80-112, Jan. 1985.

Gogan et al., "Open Market, Inc.: Managing in a Turbulent Environment," Harvard Business School Publishing, Aug. 29, 1996, pp. 1-30.

Goldberg et al., "Smalltalk-80—The Language and its Implementation," Xerox Palo Alto Research Center, 1983 (reprinted with corrections, Jul. 1985), pp. 1-720.

Gosling et al., "The Java (TM) Language Specification," Addison-Wesley, 1996.

Gottlob et al., "Extending Object-Oriented Systems with Roles," ACM Transactions On Information Systems, vol. 14, No. 3, pp. 268-296, Jul. 1996.

Gray et al., "Leases: An Efficient Fault-Tolerant Mechanism for Distributed File Cache Consistency," Proceedings of the 12th ACM Symposium on Operating Systems Principles, pp. 202-210, 1989.

Guth, "JavaOne: Sun to Expand Java Distributed Computing Effort," <http://www.sunworld.com/swol-02-1998/swol-02-sunspots.html>, XP-002109935, p. 1, Feb. 20, 1998.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hamilton et al., "Subcontract: A Flexible Base For Distributed Programming," Proceedings of 14th Symposium of Operating System Principles, Dec. 1993.

Hamilton, "Java and the Shift to Net–Centric Computing," Computer, pp. 31–39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm for Networked Systems," Technical Report 96–11, Department of Comp. Sci., Univ. of Arizona, Jun. 1996.

Hodges, Douglas, "Managing Object Lifetimes in OLE," Aug. 25, 1994, pp. 1–41.

Holman et al., "The Eden Shared Calendar System," Department of Computer Science, FR–35, University of Washington, Technical Report 85–05–02, Jun. 22, 1985, pp. 1–14.

Hoshi et al., "Allocation of the Cross–Connect Function in Leased Circuit Networks," 1992, ICC'92, conference record, SUPERCOMM/ICC '92, A New World of Communications, IEEE International Conference, pp. 1408–1412.

Howard et al., "Scale and Performance in a Distributed File System," ACM Transactions on Computer Systems, vol. 6, No. 1, pp. 51–81, Feb. 1988.

Hsu, "Reimplementing Remote Procedure Calls," University of Washington, Thesis, Mar. 22, 1985, pp. 1–106.

Hunt, "IDF: A Graphical Data Flow Programming Language for Image Processing and Computer Vision," Proceedings of the International Conference on Systems, Man, and Cybernetics, pp. 351–360, Los Angeles, Nov. 4–7, 1990.

Hutchinson, "Emerald: An Object–Based Language for Distributed Programming," a Dissertation, University of Washington, 1987, pp. 1–107.

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM Technical Disclosure Bulletin, "Local Network Monitoring to Populate Access Agent Directory," vol. 36, No. 09A, pp. 403–405, Sep. 1993.

IBM, "Chapter 6—Distributed SOM (DSOM)," SOMobjects Developer Toolkit Users Guide, Version 2.1, pp. 6–1—6–90, Oct. 1994.

Israel et al., "Authentication in Office System Internetworks," ACM Transactions on Office Information Systems, vol. 1, No. 3, Jul. 1983, pp. 193–210.

Jacob, "The Use of Distributed Objects and Dynamic Interfaces in a Wide–Area Transaction Environment," SIGCOMMn '95 Workshop on Middleware: Cambridge, Mass., Aug. 1995, pp. 1–3.

Java Remote Method Invocation Specification, JDK 1.1 FCS, Sun Microsystems, Inc. Feb. 1997, chapters 5 and 7.

Jaworski, "Java 1.1 Developer's Guide, 2nd Edition," Sams.net, 1997.

Jennings, N.R. et al., "Using Intelligent Agents to Manage Business Processes," Dept. Electronic Engineering, Queen Mary & Westfield College, Mile End Road, London., E1 4NS, U.K., XP–002254546, 1996 (pp. 345–360).

Jones et al., "Garbage Collection: Algorithms for Automatic Dynamic Memory Management," pp. 165–175, John Wiley & Sons, 1996.

Jul et al., "Fine–Grained Mobility in the Emerald System," University of Washington, ACM Transactions on Computer Systems, vol. 6, No. 1, Feb. 1988, pp. 109–133.

Jul, "Object Mobility in a Distributed Object–Oriented System," a Dissertation, University of Washington, 1989, pp. 1–154 (1 page Vita).

Kambhatla et al., "Recovery with Limited Replay: Fault–Tolerant Processes in Linda," Oregon Graduate Institute, Technical Report CSIE 90–019, pp. 1–16, Sep. 1990.

Kay et al., "An Overview of the Raleigh Object–Oriented Database System," ICL Technical Journal, vol. 7, No. 4, pp. 780–798, Oxford, GB, Nov. 1991.

Keller, "Smart Catalogs and Virtual Catalogs," Proceedings of the First USENIX Workshop of Electronic Commerce, USENIX Association, Jul. 11–12, 1995, pp. 125–131.

Klein et al., "TRADE'ex: The Stock Exchange of the Computer Industry," Harvard Business School Publishing, 1996, pp. 1–14.

Kodak Photonet Faq, PhotoNet Online, Jun. 14, 2002, pp. 1–3.

Kolodner et al., "Atomic Garbage Collection: Managing a Stable Heap," ACM, 1989, pp. 15–25.

Koshizuka et al., "Window Real–Objects: A Distributed Shared Memory for Distributed Implementation of GUI Applications," Nov. 1993, pp. 237–247.

Kougiouris et al., "Support for Space Efficient Object Invocation in Spring," Sep. 1994.

Kramer, "NETWATCH; The AJC's Daily Online Guide; Get the picture: Kodak will send photos to Web," The Atlanta Journal and Constitution, Sec. Features, p. 08C, Jun. 5, 1997.

Krasner et al., "Smalltalk–80: Bits of History, Words of Advice," 1983, Xerox Corporation, pp. 1–344.

Krasner, "The Smalltalk–80 Virtual Machine," BYTE Publications Inc., pp. 300–320, Aug. 1991.

Lamport et al., "The Byzantine Generals Problem," ACM Transactions on Programming Languages and Systems, vol. 4, No. 3, pp. 382–401, Jul. 1982.

Lampson et al., "Authentication in Distributed Systems: Theory and Practice," ACM Transactions n Computer Systems, vol. 10, No. 4, Nov. 1992, pp. 265–310.

Lansky, "Without APS, Photo Life Goes on Via Internet," Photographic Trade News, Aug. 1996, pp. 19–23.

Lavana et al., "Executable Workflows: A Paradigm for Collaborative Design on the Internet," Jun. 1997, 6 pages.

Lewis, "Pacific Bell, MCI to Expand Internet Service," The New York Times, sec. D, col. 1 at 3, Mar. 28, 1995.

LightSurf Instant Imaging—Press Releases, "Kodak And LIghtSurf Collaborate On Kodak Picture Center Online," LifeSurf Technologies Inc., Jun. 14, 2002, pp. 1–3.

LINDA Database Search, pp. 1–68, Jul 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

Louwerse et al., "Data Protection Aspects in an Integrated Hospital Information System," North–Holland Computers & Security 3, 1984, pp. 286–294.

McDaniel, "An Anlysis of a Mesa Instruction Set," Xerox Corporation, May 1982.

McEnaney, "Point–and–Click Memory Sharing; Launches PhotoNet online digital photography and imaging services," Photographic Trade News, Sec. p. 23, Jan. 1997.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Miller, "Web posting as a photo processing option," USA Today, Section: Life, p. 17D, Dec. 13, 1996.

Mitchell et al., "An Overview of the Spring System," Feb. 1994.

Mitchell et al., "Mesa Language Manual," Xerox Corporation, Palo Alto Research Center, 1978.

Morris et al., "Andrew: A Distributed Personal Computing Environment," Communications of the ACM, vol. 29, No. 3, Mar. 1986, pp. 184–201.

Mullender, "Distributed Systems," Second Edition, Addison–Wesley, 1993.

Muumert et al., "Long Term Distributed File Reference Tracing: Implementation and Experience," Carnegie Mellon University School of Computer Science, pp. 1–28, Nov. 1994.

MUX–Elektronik, Java 1.1 Interactive Course, www.lls.se/~mux/javaic.html, 1995.

O'Mahony, "Security Considerations in a Network Management Environment," IEEE Network, May/Jun. 1994, pp. 12–17.

Oppen et al., "The Clearinghouse: A Decentralized Agent for Locating Names Objects in a Distributed Environment," ACM Transactions on Office Information Systems, vol. 1, No. 3, Jul. 1983, pp. 230–253.

Opyrchal et al., "Efficient Object Serialization in Jave", Department of Electrical Engineering and Computer Science, University of Michigan, May 5, 1999.

Orfali et al., "The Essential Distributed Objects Survival Guide," Chapter 11: Corba Commercial ORBs, pp. 203–215, John Wiley & Sons, Inc., 1996.

Osborn, "The Role of Polymorphism in Schema Evolution in an Object–Oriented Database," IEEE Transactions on Knowledge and Data Engineering, vol. 1, No. 3, Sep. 1989, pp. 310–317.

Ousterhout et al., "The Sprite Network Operating System," Computer, IEEE, pp. 23–36, Feb. 1988.

Petersen, "New But Not Improved," Direct Magazine, Nov. 1995.

Pier, "A Retrospective on the Dorado, A High–Performance Personal Computer," IEEE Conference Proceedings, The 10th Annual International Symposium on Computer Architecture, 1983.

Pier, "A Retrospective on the Dorado, A High–Performance Personal Computer," Xerox Corporation, Aug. 1983.

Pinakis, "Using Linda as the Basis of an Operating System Microkernel," University of Western Australia, Department of Computer Science, pp. 1–165, Aug. 1993.

Press Release, "Sun Goes Live With The Kodak Picture Network," Sun Microsystems, Inc., Jun. 14, 2002, pp. 1–2.

Proceedings of the Eighth Symposium on Operating Systems Principles, Dec. 14–16, 1981, ACM, Special Interest Group on Operating Systems, Association for Computing Machinery, vol. 15, Nov. 5, Dec. 1981, ACM Order No. 534810.

Proudfoot, "Replects: Data Replication in the Eden System," Department of Computer Science, University of Washington, Technical Report No. TR–85–12–04, Dec. 1985, pp. 1–156.

Pu, "Replication and Nested Transaction in the Eden Distributed System," Doctoral Dissertation, University of Washington, Aug. 6, 1986, pp. 1–179 (1 page Vita).

Raeder, "Is there a Prodigy in your future?," Database Searcher, vol. 5, No. 6, p. 18, Jun. 1989.

Ramm et al., "Exu—A System for Secure Delegation of Authority on an Insecure Network," Ninth System Administration Conference, 1995 LISA IX, Sep. 17–22, 1995, pp. 89–93.

Riggs et al., "Pickling State in the Java (TM) System," USENIX Association Conference on Object–Oriented Technologies and Systems, XP–002112719, pp. 241–250, Jun. 17–21, 1996.

Rosenberry et al., "Understanding DCE," Chapters 1–3, 6, 1992.

Satyanarayanan, "Integrating Security in a Large Distributed System," ACM Transaction on Computer Systems, vol. 7, No. 3, Aug. 1989, pp. 247–280.

Schroeder et al., "Experience with Grapevine: The Growth of a Distributed System," ACM Transactions on Computer Systems, vol. 2, No. 1, Feb. 1984, pp. 3–23.

Senn, "Capitalizing on Electronic Commerce: The Role of the Internet in Electronic Markets," Information Systems Management, Summer 1996, pp. 15–24.

Sharrott et al., "ObjectMap: Integrating High Performance Resources into a Distributed Object–oriented Environment," ICODP, 1995.

Smith et al., "Object–Oriented Technology: Getting Beyond the Hype", ACM, Spring 1996, vol. 27, pp. 20–29.

Steinke, "Design Aspects of Access Control in a Knowledge Base System," Computers & Security, 10, 1991, pp. 612–625.

Stern, "Industry Net," Link–Up, Mar./Apr. 1995, p. 10.

Stevenson, "Token–Based Consistency of Replicated Servers," IEEE, CH2686–4/89/0000/0179, pp. 179–183, 1989.

Tanenbaum et al., "Distributed Operating Systems," Computing Surveys, vol. 17, No. 4, Dec. 1985, pp. 419–470.

The Wall Street Journal, "Barclays Is Opening An 'Electronic Mall' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Thompson, "Regular Expression Search Algorithm," Communications of the ACM, vol. II, No. 6, p. 149 et seq., Jun. 1968.

Trehan et al., "Toolkit for Shared Hypermedia on a Distributed Object Oriented Architecture," 1993, pp. 1–8.

Trommer, "Thomas Unveils Online Purchasing Network—Eases Product Sourcing And Ordering Through EDI," Electronic Buyers' News at 60, Dec. 11, 1995.

Van Den Berg et al., "Advanced Topics of a Computer Center Audit," North–Holland Computers & Security 3, 1984, pp. 171–185.

Van Der Lans, "Data Security in a Relational Database Environment," North–Holland Computers & Security 5, 1986, pp. 128–134.

Venners, "Jini Technology, Out of the Box," JAVAWORLD, 'Online!, pp. 1–4, Dec. 1998.

Waldo et al., "Events in An RPC Based Distributed System," Proceedings Of The 1995 USENIX Technical Conference, Proceedings USENIX Winter 1995 Technical Conference, New Orleans, LA, USA, 16–20, pp. 131–142, Jan. 1995.

Welz, "New Deals: A ripening Internet market, secure systems and digital currency are reshaping global commerce," Internet World, Jun. 1995, pp. 36–41.

Wilson et al., "Design of the Opportunistic Garbage Collector," Proceedings of the Object Oriented Programming Systems Languages And Applications Conference, New Orleans, vol. 24, No. 10, Oct. 1989.

Wobber et al., "Authentication in the Taos Operating System," ACM, 1993, pp. 256–269.

Wollrath et al., "A Distributed Object Model for the Java (TM) System," USENIX Association, Conference on Object-Oriented Technologies and Systems, Jun. 17–21, 1996.

Wu, "A Type System For An Object–Oriented Database System," Proceedings of the International Computer Software and Applications Conference (COMPSAC), Tokyo, Japan, pp. 333–338, Sep. 11–13, 1991.

Wyatt, "Netscape Enterprise Server," Prima Publishing, 1996.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large–Scale Systems," Computer Services Department, University of Texas at Austin, p. 285–294, May 26–28, 1998.

Yin et al., "Volume Leases for Consistency in Large–Scale Systems," IEEE Transactions on Knowledge & Data Engineering, vol. 11, No. 4, pp. 563–576, Jul./Aug. 1999.

Cary G. Gray and David R. Cheriton, "Leases: An Efficient Fault–Tolerant Mechanism for Distributed File Cache Consistency", 1989, ACM, pp. 202–210.

Gray et al., "Leases: An Efficient Fault–Tolerant Mechanism for Distributed File Cache Consistency," ACM, pp. 202–210, 1989.

H.A. Smith and J.D. McKeen, "Object–Oriented Technology: Getting Beyond the Hype", ACM, Spring 1996, vol. 27, pp. 20–22.

* cited by examiner

REMOTE OBJECT ACTIVATION IN A DISTRIBUTED SYSTEM

BACKGROUND OF THE INVENTION

The present invention relates generally to distributed computer systems, and more specifically, to managing and activating objects in distributed computer systems.

A distributed computer system is a network of computer processors that although geographically separated, are linked together functionally. It is often desirable to execute a computer program, or portions of a computer program, simultaneously across several computer processors in the distributed system. In such an environment, protocols coordinating the various portions of the program(s) are necessary.

Distributed computing systems executing object-oriented programming models are known. Essentially, in these systems, programs are written as an aggregation of objects, each of which may reside on and be executed on a different computer in the distributed system.

Typically, in an object-oriented distributed system, a local computer system, called the client, may access objects on remote computer systems. If the objects to be accessed on the remote computer system take up processor resources, i.e., if they consume physical or virtual memory and have a thread of control, they are said to be "active." Examples of such active objects include running programs or objects that are part of active programs. Such objects are always taking up resources from the physical machine, even when they are not doing active work on behalf of themselves or at the request of some other object.

A "passive" object, on the other hand, refers to a presently non-active object on the remote computer. If a passive object is "activatable," it may, at the request of the client computer system, be brought into an active state. Objects may be passive simply because they have never been instantiated. Alternatively, to save system resources, active objects may be de-activated and become passive. In particular, for active objects that have become quiescent, it may be advantageous for the computer to save the state information of the object to a stable storage medium, such as a magnetic disk, and release any memory or threads of control associated with the object. The de-activated object does not take up physical or virtual memory and is not associated with a control thread, although it continues to exist and may be made active when called.

One known distributed system capable of activating objects is the object management groups Common Object Request Broker Architecture (CORBA) system. In the CORBA system, remote objects are always considered by the client to be potentially passive, and thus activatable, regardless of whether the object is actually active or passive. Additionally, although some objects at a remote system may be similar to one another, and capable of benefiting from a sharing of common resources, CORBA does not provide for the associating of similar objects.

There is, therefore, a need for a distributed system object management architecture that solves the above mentioned limitations found in the prior art.

SUMMARY OF THE INVENTION

Objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, a first aspect of the present invention includes a method of calling a remote object by a process comprising the steps of: (1) calling the remote object directly using a first address in a faulting remote reference to the remote object when the reference refers to an active instance of the remote object; and (2) calling an activator object using a second address in the faulting remote reference to perform activation of the remote object when the reference to the remote object does not refer to an active instance of the remote object. In an alternative aspect, a computer readable medium contains instructions for performing similar steps.

A second method consistent with the present invention includes a method of handling an object call at a remote site for a remote object, the method comprises the steps of: (1) determining whether a first predefined group of objects corresponding to the called remote object is active; (2) activating the remote object within the first group when the determining step determines that the first group is active; and (3) creating a second group of objects and activating the remote object within the second group when the determining step determines that the first group is not active. As with the first method, an alternative aspect includes a computer readable medium containing instructions for performing similar steps.

Still further, a distributed computer system consistent with the present invention includes a plurality of elements, including first and second computers. The second computer, in particular, receives requests for remote objects from the first computer and executes an object activator performing the steps of: (1) determining whether a first predefined group of objects corresponding to the requested remote object is active; (2) activating the requested remote object within the first group of objects when the determining step determines that the first group of objects is active; and (3) creating a second group of objects and activating the requested remote object within the second group of objects when the determining step determines that the first group of objects is not active.

BRIEF DESCRIPTION OF THE DRAWINGS

The accompanying drawings, which are incorporated in and constitute a part of this specification, illustrate several embodiments consistent with this invention and, together with the description, help explain the principles of the invention. In the drawings.

DESCRIPTION OF THE PREFERRED EMBODIMENT

A distributed computer system and related methods consistent with the present invention are described herein. The distributed computer system uses a single interface at the client site to handle calls to call both active and activatable remote objects. Further, remote objects are aggregated into common groups of objects, thereby providing greater security between objects of disparate groups and efficiency between related objects of the same group.

Wherever possible, the same reference numbers will be used throughout the drawings to refer to the same or like parts.

Figure 1:
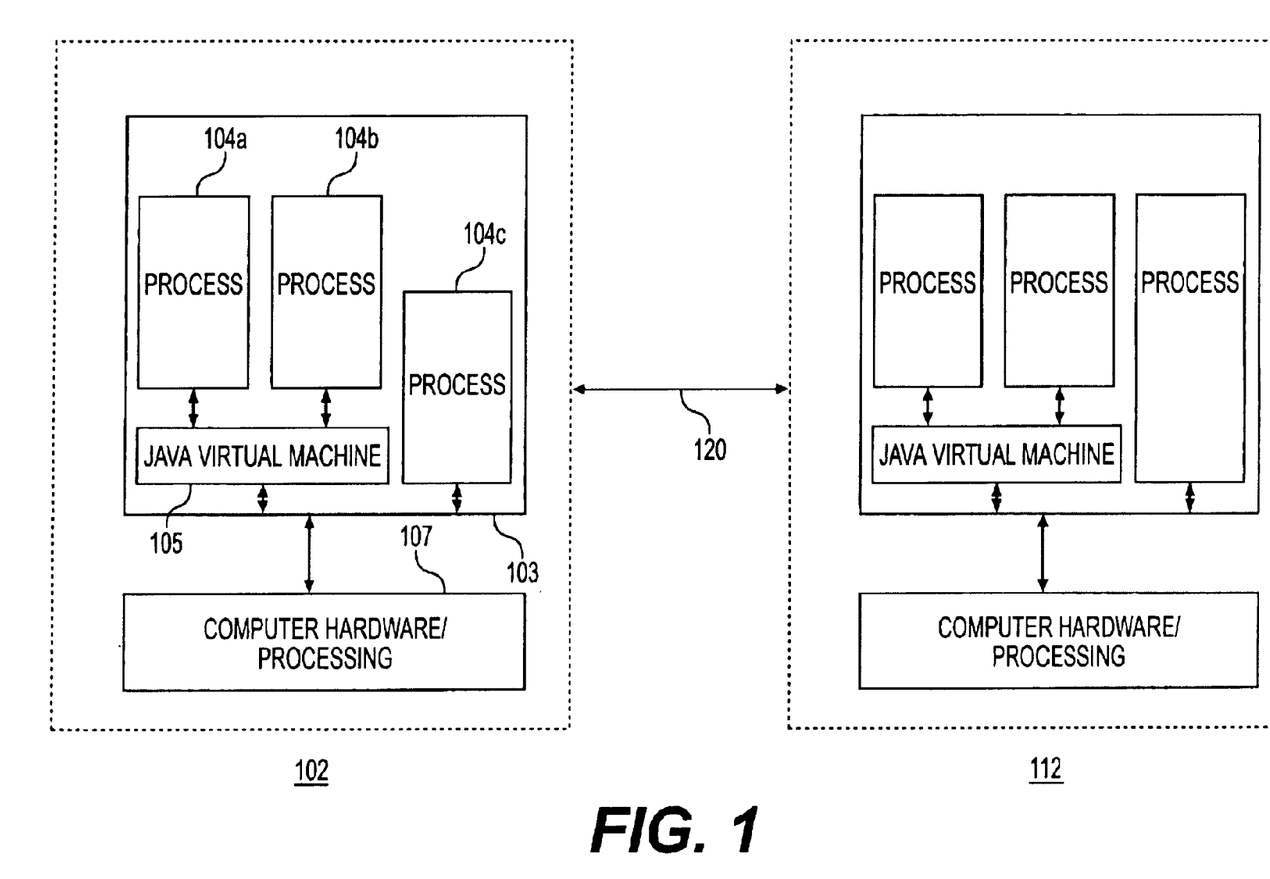
FIG. 1 is a high-level block diagram illustrating interaction of hardware and software components in an exemplary distributed computer system consistent with the present invention.

FIG. 1 is a high-level block diagram illustrating interaction of hardware and software components in an exemplary distributed computer system. Computer 102 includes a computer hardware/processing section 107 executing programs from memory section 103. Memory 103 is preferably a random access memory, but may additionally or alternatively include other storage media such as magnetic or optical disks.

Memory 103 stores one or more computer procedures 104a, 104b, and 104c, such as, for example, a computer program, thread, or object. Computer threads 104a and 104b are programs comprised of Java bytecodes executing through a Java virtual machine 105. The virtual machine is itself a process that when executed on computer 102, translates threads 104a and 104b into computer instructions native to computer hardware 107. In this manner, virtual machine 105 acts as an interpreter for computer hardware 107. In contrast to threads 104a and 104b, program 104c uses instructions native to computer hardware 107, and thus does not require virtual machine 105.

Computer 102 is connected via network 120 to computer 112. Computer 112 includes components similar to those of computer 102, and will therefore not be described further. Although the simple network described above includes only two computers, networks of many computers, or even networks of many thousands of computers, such as the Internet, may be used to implement the concepts of the present invention.

Throughout the remainder of this disclosure, computer system 102 will be described as the requester of remote objects. Computer system 112 executes the remote objects and returns results to computer 102. Although not explicitly shown, a plurality of computer systems 112 may execute multiple objects for a single host computer 102.

Figure 2:
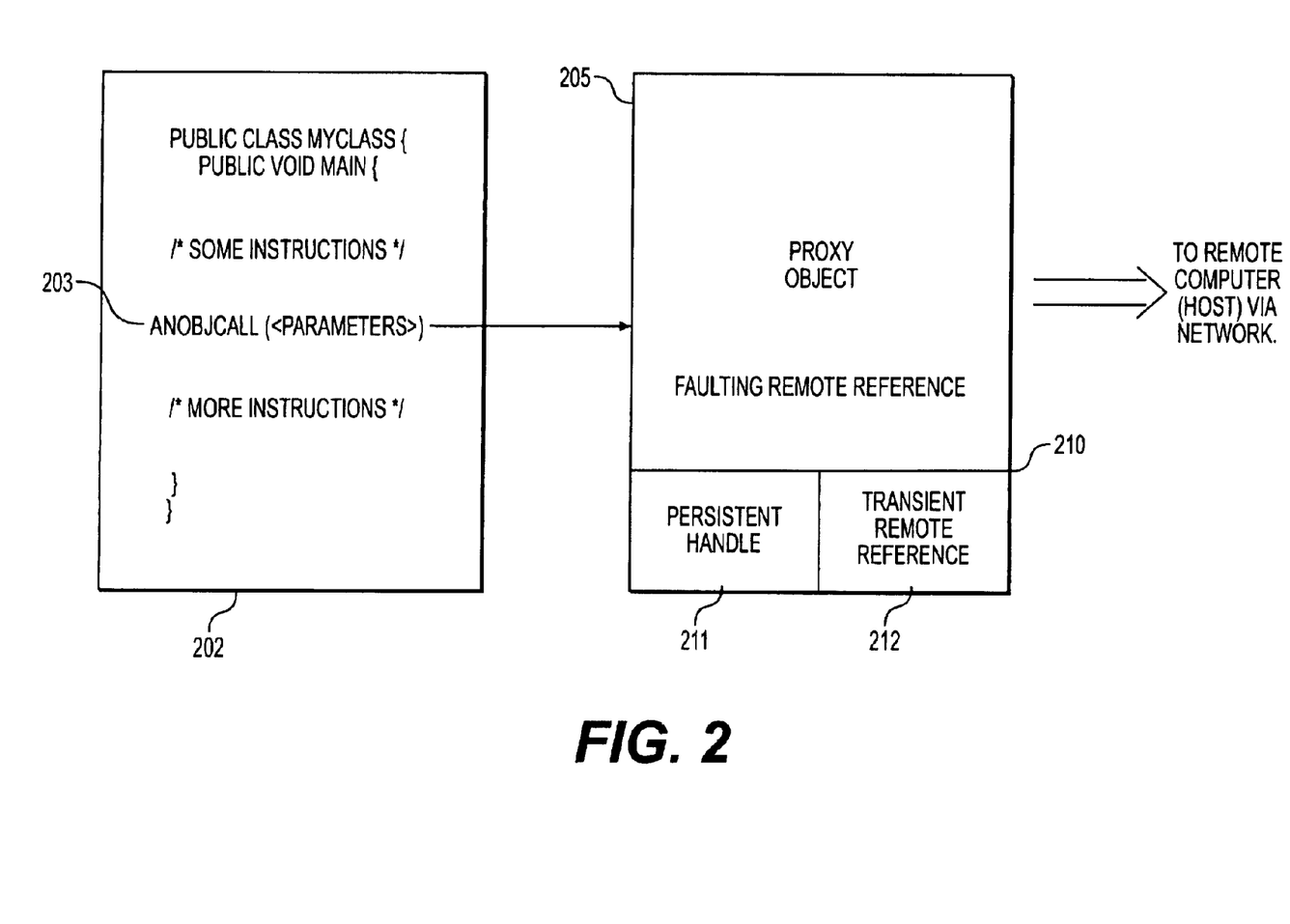
FIG. 2 is a block diagram illustrating software entities located on a local computer.

FIG. 2 is a block diagram illustrating software entities located on computer 102.

Process 202 is a program active on computer 102, such as process 104 in FIG. 1. As shown, process 202 includes a plurality of bytecodes that may be translated from instructions written in the Java programming language, including instruction 203, which is an invocation to a method residing in an object on remote computer 112. The method invocation is preferably defined to be handled by local proxy object 205, which functions as an interface for remote object calls from computer 102 and hides the remote calling protocol from the invocating process.

Proxy 205 may assume one of multiple implementations depending on the status of the object being referenced; such as whether the object is active or activatable (i.e., presently passive). When called by process 202, proxy 205 packages the call using the appropriate implementation and forwards it to remote computer 112. Results received from the remote computer, such as results from the method invocation, are passed back through proxy 205 to process 202.

As described in more detail below, proxy 205 enables process 202 to make a single method invocation for both active and activatable objects. In other words, process 202 is not required to monitor whether a remote object is active or activatable.

Activation of remote objects by proxy 205 is implemented through an object reference known as a faulting remote reference, illustrated by reference 210. For each remote object, faulting remote reference 210 is used to "fault in" the object's reference upon the first method invocation to the object. Faulting remote reference 210 includes a persistent handle (an activation identifier) 211 and a transient remote reference 212. Both persistent handle 211 and transient remote reference 212 are obtained from the remote computer corresponding to the remote object, and contain address information for contacting the remote computer, such as the appropriate network address and port number, and address information more specific to the remote object being referred. Persistent handle 211 is the more general reference and references an activator entity (described in more detail below) at the remote host. Reference 212 is the actual "live" reference to the active remote object, and is used to contact the remote object directly.

In operation, upon invocation of a method requiring a remote object, proxy 205 checks reference 210. A null value in "live" reference 212 indicates that the remote object may become passive (i.e., it is not an active-only object), and proxy 205 uses activation identifier 211 to contact an activator entity at the remote site. If reference 212 is not null it will point directly to the remote object. This indicates an active remote object, which proxy 205 contacts directly.

Figure 3:
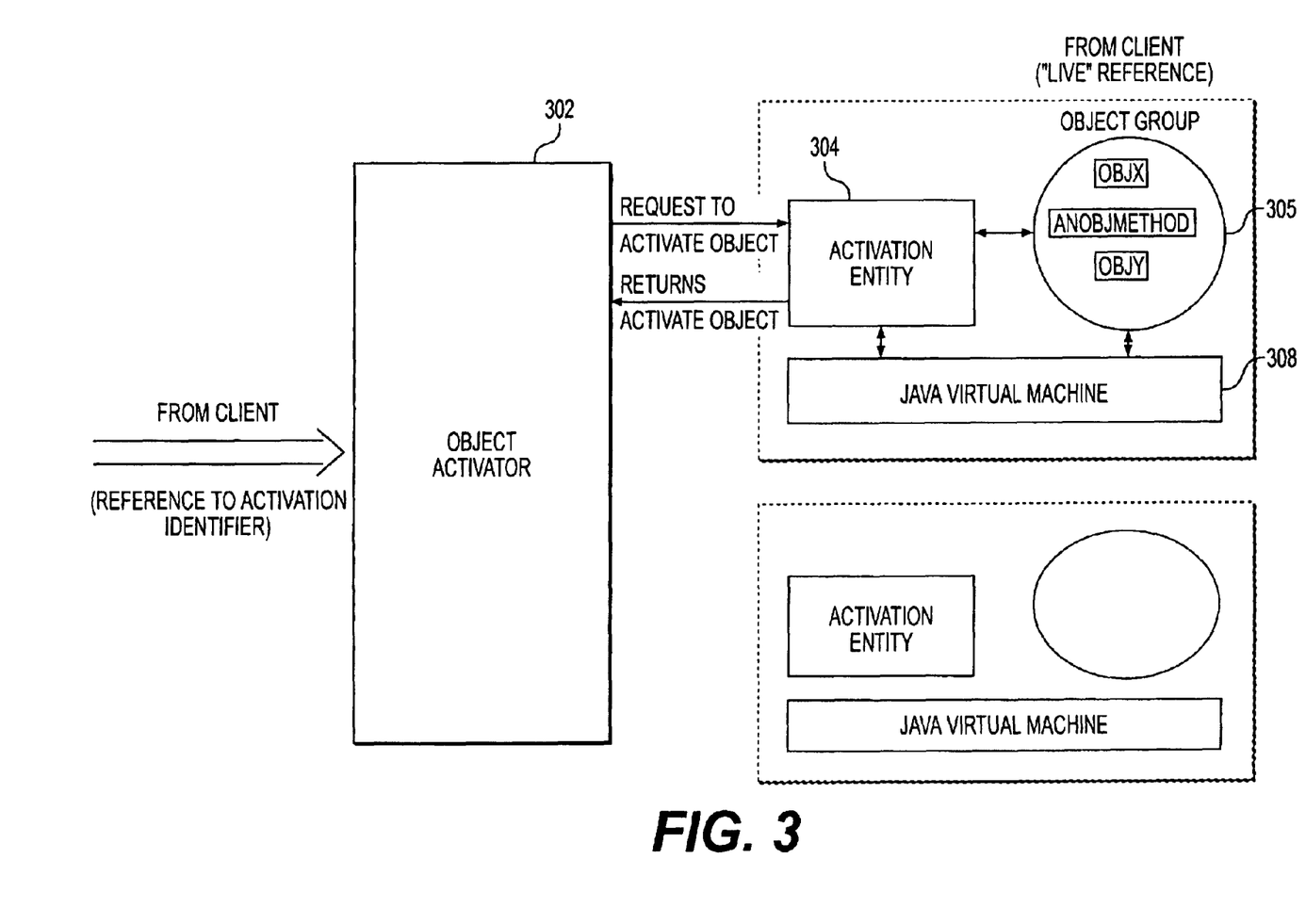
FIG. 3 is a block diagram illustrating software entities located on a remote host computer.

FIG. 3 is a block diagram illustrating software entities located on host computer 112. As mentioned previously, host computer 112 is contacted by the client using either the activation identifier reference 211 or "live" reference 212. Activation identifier reference 211 references object activator 302, which supervises object activation on the host. Activator 302 functions as: (1) a database that maps activation identifiers 211 to the information necessary to activate an object (e.g., the object's class, the location a URL from where the class can be loaded, specific data the object may need to bootstrap, etc.); (2) a database for tracking the current mapping of activation identifiers to active objects; and (3) a manager of Java virtual machines.

Activatable objects are defined by the designer to exist as a member of a group of objects, such as group 305. The designer preferably assigns objects to particular groups so that objects within a group are designed to interact with one another. For example, objects within a group should have a relationship of mutual trust strong enough to allow them all to run within a single Java virtual machine 308. Once assigned to a group, objects stay within that group.

Activation entity 304 manages object group 305. In particular, activation entity 304 activates passive objects and creates objects pursuant to requests from object activator 302, and returns a reference to the corresponding activated object to object activator 302. To activate a quiescent object within group 305, activation entity 304 allocates the appropriate operating system resources (memory, process, or thread allocation) and starts up the object. After activating an object, activation entity 304 passes information to object activator 302 describing the way in which the object is to be reached for further communication. Object activator 302 may then forward this information to proxy 205, which appropriately updates faulting remote reference 210. If an object later de-activates, or is de-activated, object activator 302 similarly communicates with proxy 205 to update the faulting remote reference.

Preferably, one activation entity 304 exists per each active Java virtual machine 308.

Figure 4:
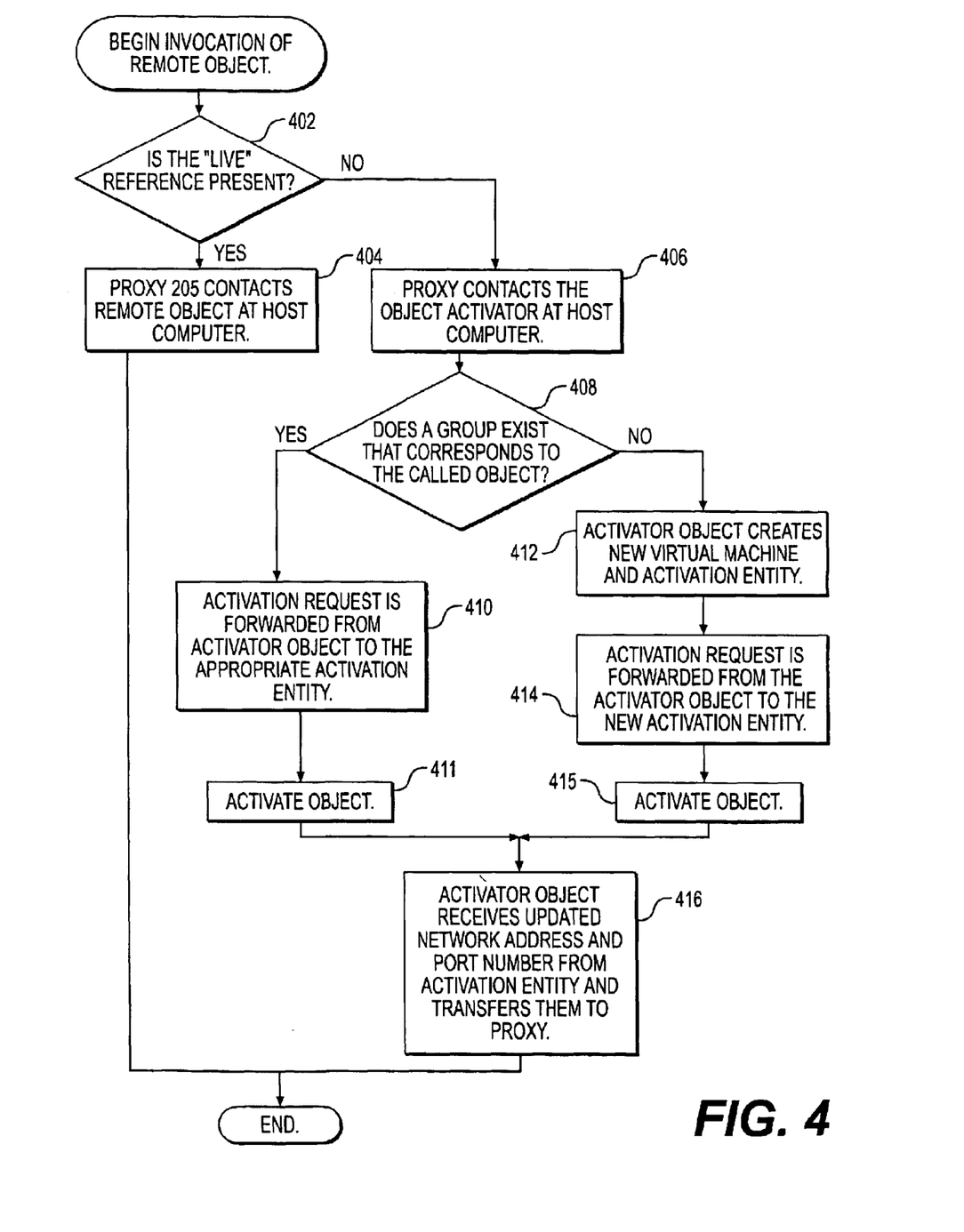
FIG. 4 is a flow chart illustrating steps consistent with the present invention.

FIG. 4 is a flow chart further illustrating steps consistent with the present invention. Upon invocation of a remote object by computer 102, proxy 205 determines if the transient remote reference (the "live" reference) 212 at computer 102 is present, i.e., if it is not null, and proxy 205 contacts the active remote object (steps 402, 404). Otherwise, proxy 205 uses persistent handle 211 within reference 210 to contact object activator 302 (steps 402, 406). Object activator 302 uses information within reference 210 to determine if an object group corresponds to the invoked object (step 408). If an appropriate group is already active, an activation request for the called object is forwarded to the appropriate activation entity (steps 408, 410), and the object is activated (step 411). Otherwise, the activator object first creates a new virtual machine and a new activation entity (steps 408, 412), and then forwards the activation request to the newly created activation entity, (step 414), at which point the object is activated (step 415). In response to forwarding an activation request to an activation entity, the object activator will usually receive an updated network address and port number, which it forwards to proxy object 205 (step 416).

As described above, object groups such as group 305 form the basic unit of object activation. Object activator 302 and activation entities 304 manage the object groups, such that if a group has not been activated then a call to any object of an object group will cause the activation of that object group and the called object in a new Java virtual machine.

Clustering objects within an object group on a single Java virtual machine allows related objects to share an address space, which in turn allows close communication between the objects. Objects in different groups, on the other hand, are in different Java virtual machines and thus have a much stronger security separation, ensuring that those objects will not interfere, either intentionally or unintentionally, with each other.

Further, a single interface is seen by clients attempting to call remote objects. The interface has multiple implementations depending on the status of the object being referenced, allowing for transparent mixing of active and passive (i.e., activatable) objects in the same system, supporting both without requiring that the clients of those objects have any knowledge of whether or not the object is activatable. This interface provides the client the ability to make any calls that are supported by the remote object through a faulting remote reference.

It will be apparent to those skilled in the art that various modifications and variations can be made to the concepts of the present invention and in its construction without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of remotely activating objects, the method comprising:
   receiving a first request to activate a first object of a first object group;
   in response to the received first activate request, determining whether a first virtual machine associated with the first object group exists;
   if it is determined that the first virtual machine does not exist, creating the first virtual machine and a first activation entity for managing the first object group associated with the first virtual machine; and
   forwarding the first activate request to the first activation entity associated with the first virtual machine,
   wherein the first group of objects is a first subset of all objects that can be remotely activated, and
   wherein objects of the first object group are executed only in the first virtual machine.

2. The method as recited in claim 1, wherein the first object group comprises objects that a user predetermined to be in the first object group.

3. The method of claim 1, wherein:
   the first activate request is received by an object activator; and
   the object activator passes the first activate request to the first activation entity.

4. The method of claim 1, wherein the first virtual machine only executes on objects in the first object group.

5. The method of claim 1, wherein:
   the first activate request is sent by a first computer; and
   the first activate request is received at a second computer different from the first computer.

6. The method of claim 5, wherein the first virtual machine is created in the second computer.

7. The method of claim 1, further comprising:
   receiving a second request to activate a second object of a second object group;
   in response to the received second activate request, determining whether a second virtual machine associated with the second object group exists;
   if it is determined that the second virtual machine does not exist, creating the second virtual machine and a second activation entity associated with the second virtual machine; and
   forwarding the second activate request to the second activation entity associated with the second virtual machine,
   wherein the second group of objects is a second subset of all objects that can be remotely activated,
   wherein objects of the second object group are executed only in the second virtual machine, and
   wherein no object in the first object group is in the second object group.

8. The method of claim 7, wherein:
   the first virtual machine only executes on objects in the first object group; and
   the second virtual machine only executes on objects in the second object group.

9. The method as recited in claim 7, wherein the second object group comprises objects that a user predetermined to be in the second group.

10. The method of claim 7, wherein the first and second activate requests are received by an object activator.

11. The method of claim 10, wherein the object activator is coupled to the first and second activation entities.

12. The method of claim 7, wherein:
   the first activate request is sent by a first computer; and
   the first activate request is received at a second computer different from the first computer.

13. The method of claim 12, wherein the first virtual machine is created in the second computer.

14. The method of claim 12, wherein:
   the second activate request is sent by the first computer; and
   the second activate request is received at the second computer.

15. The method of claim 14, wherein the second virtual machine is created in the second computer.

16. A computer-implemented method of handling an object call for an object, the method comprising:

receiving a first object call to remotely activate a first object;

in response to the received first object call, determining whether a first object group corresponding to the first object is active; and if it is determined that the first object group is not active, creating the first object group and activating the first object within the created first object group, wherein creating the first object group comprises instantiating a first virtual machine and a first activation entity associated with the first virtual machine, and activating the first object within the created first object group comprises forwarding the first activate request to the first activation entity associated with the first virtual machine, wherein the first object group is a first subset of all objects that can be remotely activated and objects of the first object group are executed only in the first virtual machine.

17. The method as recited in claim 16, wherein the first object group comprises objects that a user predetermined to be in the first object group.

18. The method of claim 16, further comprising:

receiving a second object call to remotely activate a second object;

in response to the received second object call, determining whether a second object group corresponding to the second object is active; and if it is determined that the second object group is not active, instantiating the second object group and activating the second object within the created second object group, wherein the second object group is a second subset, different from the first subset, of all objects that can be remotely activated.

19. The method of claim 18, wherein:

creating the second object group comprises creating a second virtual machine and a second activation entity associated with the second virtual machine; and activating the second object within the created second object group comprises forwarding the second activate request to the second activation entity associated with the second virtual machine, wherein objects of the second object group are executed only in the second virtual machine.

20. The method of claim 19, wherein:

the first virtual machine only executes on objects in the first object group; and the second virtual machine only executes on objects in the second object group.

21. A computer-implemented method of remotely accessing objects, the method comprising:

receiving a first request to remotely access a first object of a first object group;

in response to the received first access request, determining whether the first object is active;

if it is determined that the first object is inactive, determining whether there is a first virtual machine associated with the first object group;

if it is determined that the first virtual machine does not exist, creating the first virtual machine and a first activation entity for managing the first object group associated with the first virtual machine; and forwarding the first access request to the first activation entity associated with the first virtual machine, wherein the first object group is a first subset of all objects that can be remotely accessed, and wherein objects of the first object group are executed only in the first virtual machine.

22. The method as recited in claim 21, wherein the first object group comprises objects that a user predetermined to be in the first object group.

23. The method of claim 21, wherein the first virtual machine only executes on objects in the first object group.

24. The method of claim 21, wherein:

the first access request is sent by a first computer; and the first access request is received at a second computer different from the first computer.

25. The method of claim 24, wherein the first virtual machine is created in the second computer.

26. The method of claim 21, further comprising:

receiving a second request to access a second object of a second object group;

in response to the received second access request, determining whether a second virtual machine associated with the second object group exists;

if it is determined that the second virtual machine does not exist, creating the second virtual machine and a second activation entity associated with the second virtual machine; and forwarding the second access request to the second activation entity associated with the second virtual machine, wherein the second group of objects is a second subset of all objects that can be remotely accessed, wherein objects of the second object group are executed only in the second virtual machine, and wherein no object in the first object group is in the second object group.

27. The method as recited in claim 26, wherein the second object group comprises objects that a user predetermined to be in the second group.

28. The method of claim 26, wherein:

the first virtual machine only executes on objects in the first object group; and the second virtual machine only executes on objects in the second object group.

29. The method of claim 26, wherein:

the first access request is sent by a first computer; and the first access request is received at a second computer different from the first computer.

30. The method of claim 29, wherein the first virtual machine is created in the second computer.

31. The method of claim 29, wherein:

the second access request is sent by the first computer; and the second access request is received at the second computer.

32. The method of claim 31, wherein the second virtual machine is created in the second computer.

33. A system for remotely activating objects, comprising:

means for receiving a first request to activate a first object of a first object group;

means for determining whether a first virtual machine associated with the first object group exists in response to the received first activate request;

means for creating the first virtual machine and a first activation entity for managing the first object group associated with the first virtual machine if it is determined that the first virtual machine does not exist; and means for forwarding the first activate request to the first activation entity associated with the first virtual machine, wherein the first group of objects is a first subset of all objects that can be remotely activated, and wherein objects of the first object group are executed only in the first virtual machine.

34. A computer-readable medium including instructions for performing a method, when executed by a processor, for remotely activating objects, the method comprising:

receiving a first request to activate a first object of a first object group;

determining whether a first virtual machine associated with the first object group exists in response to the received first activate request;

creating the first virtual machine and a first activation entity for managing the first object group associated with the first virtual machine if it is determined that the first virtual machine does not exist; and forwarding the first activate request to the first activation entity associated with the first virtual machine, wherein the first group of objects is a first subset of all objects that can be remotely activated, and wherein objects of the first object group are executed only in the first virtual machine.

35. A system for remotely accessing objects, comprising:

means for receiving a first request to remotely access a first object of a first object group;

means for determining whether the first object is active in response to the received first access request;

means for determining whether there is a first virtual machine associated with the first object group if it is determined that the first object is inactive;

means for creating the first virtual machine and a first activation entity for managing the first object group associated with the first virtual machine if it is determined that the first virtual machine does not exist; and means for forwarding the first access request to the first activation entity associated with the first virtual machine, wherein the first object group is a first subset of all objects that can be remotely accessed, and wherein objects of the first object group are executed only in the first virtual machine.

36. A computer-readable medium including instructions for performing a method, when executed by a processor, for remotely accessing objects, the method comprising:

receiving a first request to remotely access a first object of a first object group;

in response to the received first access request, determining whether the first object is active;

if it is determined that the first object is inactive, determining whether there is a first virtual machine associated with the first object group;

if it is determined that the first virtual machine does not exist, creating the first virtual machine and a first activation entity for managing the first object group associated with the first virtual machine; and forwarding the first access request to the first activation entity associated with the first virtual machine, wherein the first object group is a first subset of all objects that can be remotely accessed, and wherein objects of the first object group are executed only in the first virtual machine.

\* \* \* \* \*